Aug. 17, 1965 P. H. PETERS, JR., ETAL 3,201,712

TUNABLE MAGNETRON APPARATUS

Filed June 8, 1953

Inventors:
Philip H. Peters Jr.,
Donald A. Wilbur,
by Paul A. Frank
Their Attorney.

United States Patent Office 3,201,712
Patented Aug. 17, 1965

3,201,712

TUNABLE MAGNETRON APPARATUS

Philip H. Peters, Jr., and Donald A. Wilbur, Schenectady, N.Y., assignors to General Electric Company, a corporation of New York Filed June 8, 1953, Ser. No. 360,328
9 Claims. (Cl. 331—90)

Our invention relates to magnetron tuning means.

Magnetron discharge devices are often employed for the generation of high frequency energy, and when so employed it is often desirable to tune or modulate the output frequency over a wide range. One such means, herein referred to as voltage tuning, is described and claimed in our copending application Ser. No. 169,712, filed June 22, 1950, now patent No. 2,774,039, dated December 11, 1956, and assigned to the assignee of the present invention. In that application it is disclosed that with either a limited cathode emission or heavy anode circuit loading or both, the magnitude of the unidirectional voltage applied to the magnetron anode determines the magnetron oscillator frequency. However, the impedance of such an output circuit may be too low if very broadly tuned, or likewise too low at frequencies other than those to which it is tuned, to permit a large transfer of power to the external load over a wide frequency range. Accordingly, for good power output a tuned output circuit is desirable to provide a sufficiently high output impedance for the magnetron oscillator; if voltage tuning is desired it is likewise desirable that the output impedance be maintained over a wide range of frequencies.

It is therefore an object of the invention to provide a magnetron oscillator for producing high output power levels over a wide range of frequencies.

It is a further object of the invention to provide a magnetron output circuit having high impedances over a large frequency range.

It is another object of the invention to provide a magnetron oscillator for providing power output at a plurality of spaced discrete operating frequencies.

It is a still further object of the invention to provide an improved voltage tunable magnetron oscillator.

Briefly described, in accordance with the illustrated embodiment of the invention, a transmission line section which is electrically long with respect to at least the higher frequencies in the desired operating range is coupled to the anode segments of a voltage tunable magnetron to provide the magnetron output circuit. The long transmission line is reflectively terminated, thus causing it to act as a resonator having impedance maxima at discrete, substantially equally frequency intervals over a wide range of frequencies. Accordingly, as the magnetron anode voltage is increased above that level required for operation at the lowest frequency impedance maximum in the desired operating range, the magnetron oscillates successively at each higher frequency corresponding to an impedance maximum of the output system so that substantial output powers may be obtained at these frequencies. In this way the obtainable power output range is vastly increased over that obtainable with any wide band singly tuned resonant system. The tuning or switching is also greatly simplified over that of any of the conventional multiply-tuned systems used to provide a graduated scale of frequency responses since the desired frequency is selected by the magnetron anode voltage.

The invention itself together with its further objects and advantages may best be understood by reference to the following description taken in connection with the accompanying drawings in which.

Figures 1, 2, 3, 4, 5:
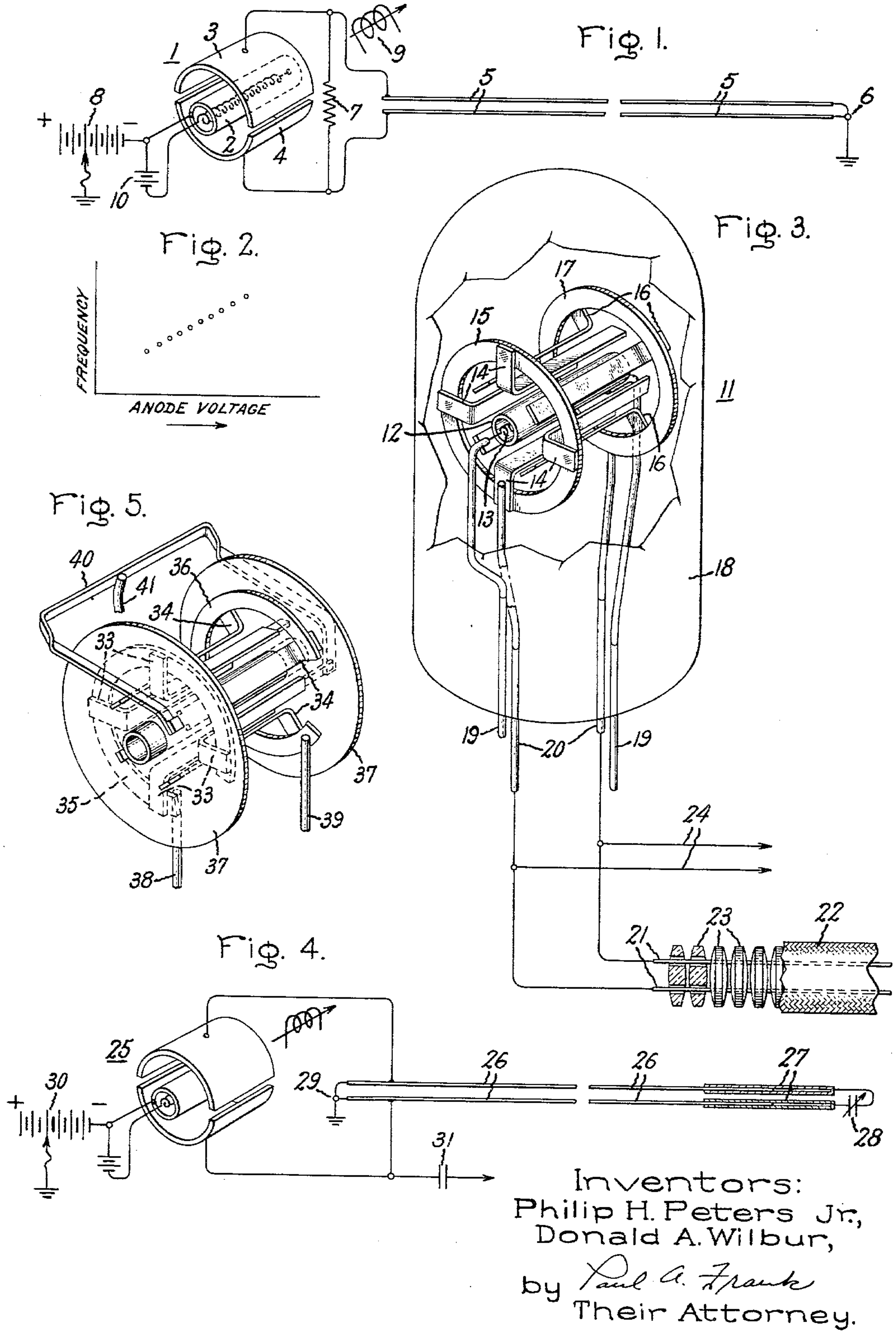
FIG. 1 is a semi-schematic representation of magnetron apparatus embodying the invention.
FIG. 2 shows the relation between frequency and anode voltage.
FIG. 3 is a perspective view of a magnetron discharge device employed in the apparatus of FIG. 1.
FIG. 4 is a semi-schematic representation of another apparatus embodying the invention.
FIG. 5 is a perspective view of a portion of a magnetron discharge device employed in the apparatus of FIG. 4.

Referring now to FIG. 1, a magneton discharge device 1 has an elongated centrally disposed cathode 2 positioned between the facing surfaces of two anode segments 3 and 4 which are shaped to define a cylindrical space charge chamber between them. The magnetron is of a type designed to be operated as a traveling wave magnetron oscillator and a two-conductor transmission line section 5 having a length L coupled to the magnetron anode segments to form the output circuit thereof. The conductors at one end of the transmission line 5 are accordingly connected to the respective anode segments 3 and 4, the line impedance suitably matching the anode impedance of the magnetron. At the other end of the transmission line 5 is a line termination 6, which may suitably take the form of a short-circuiting connection across the transmission line conductors. An impedance 7 connected across the anodes represents the useful load.

The proper operating conditions for the magnetron oscillator are provided by applying a radial electric field in the space charge chamber and an axial magnetic field therethrough. The electric field is suitably provided by a source of adjustable unidirectional voltage 8 represented as a battery having a grounded adjustable positive terminal. The direct current connection to the anode is suitably made through a grounded tap on the line terminating connections 6, so that the direct current voltage is applied to both segments 3 and 4 while maintaining both anode segments balanced with respect to the cathode. The ground connection, which is the positive voltage connection to the anodes may also be made elsewhere on either transmission line conductor or on either anode at the possible sacrifice of oscillator stability. The axial magnetic field is provided by any conventional means such as a solenoid 9. Permanent magnets may, of course, be substituted. The cathode 2 is conventionally provided with a thermionic coating, and a suitable source of heater voltage 10 is connected to the cathode.

The orthogonal magnetic and electric fields together impart an average angular velocity about the cathode to the emitted electrons constituting the magnetron space charge, the velocity depending upon the relative values of the electric and magnetic fields. According to the prevailing conventional theory of operation of traveling wave magnetron oscillators the initial oscillations in the output circuit induced by the space charge are reinforced as the electrons are focused in phase with the induced alternating electric fields across the gaps between the spaced anode segments. Electrons rotating about the cathode and traveling across an anode gap at an instant when the fringing electric field is in the same direction or in phase therewith must work against that field and thereby give up some of their kinetic energy to reinforce the field. These in-phase electrons, upon losing part of their energy, assume a greater orbital radius and eventually are collected by the anode. The space charge spoke thus formed my be considered as an electronic commutator, one spoke being formed for each pair of anode segments in the usual $\pi$ mode of oscillation.

As the radial electric field is increased in intensity by increasing the voltage applied from the source 8, the average angular velocity of the space charge spoke tends to exceed synchronism, i.e., the space charge velocity tends to become greater than the frequency of the travelling wave component traveling around the anode array in the same direction. As pointed out in our copending application Ser. No. 169,712, filed June 22, 1950, and assigned to the assignee of the present invention, under certain conditions the magnetron may develop substantial power at frequencies exceeding the frequency to which the magnetron output circuit is tuned. To overcome the tendency of the oscillator to remain at the resonant frequency such voltage tuning is achieved by either loading the output circuit much more heavily than desired for conventional operation or by limiting the cathode emission. In the instant application the latter means is employed by maintaining a relatively low heater temperature. As is further pointed out in the forementioned application, under this condition a high alternating voltage cannot be maintained between the anode segments and the ability of that voltage to lock the space charge in synchronism with a fixed frequency is decreased.

The transmission line 5 which constitutes the output circuit for the magnetron has a length L which is long with respect to frequencies in the desired tuning range. Accordingly, since the line is not terminated in its characteristic impedance, it presents a relatively high impedance for the series of frequencies which correspond to the resonant frequencies of the line. A high impedance is presented every $$\frac{V_p}{2L}$$

cycles per second, where $V_p$ is the velocity of wave propagation along the line and L is the line length. This follows from a consideration of the nature of the voltage distribution on a transmission line which is open at one end (anode end) and short circuited at the other end. A voltage maximum (which, in this case, is an impedance maximum) will occur at the open end when the frequency is such that the line length is an odd number of quarter wavelengths, or $$L=n\left(\frac{\lambda}{2}\right)-\frac{\lambda}{4}=\frac{\lambda}{2}\left(n-\frac{1}{2}\right)$$

where $n$ is any integer and $\lambda$ is the wavelength at the frequency concerned.

Since $$\lambda=\frac{V_p}{f}$$

where $f$ is the magnetron frequency, then $$L=\frac{V_p}{2f}\left(n-\frac{1}{2}\right)$$

and $$f=\frac{V_p}{2L}\left(n-\frac{1}{2}\right)$$

For increasing values of $n$ ($n=1, 2, 3, \ldots$), $$f=\frac{V_p}{4L}, \frac{3V_p}{4L}, \frac{5V_p}{4L}, \ldots$$

The separation between frequencies is thus $$f=\frac{V_p}{2L}$$

This is twice the lowest frequency (corresponding to $n=1$).

Similar relations may be derived for transmission lines otherwise reflectively terminated. For example, if the line is short-circuited at both ends and driven by the magnetron at an intermediate point, the line must always be an integral number of half waves long, $$\left(f=n\frac{V_p}{2L}\right)$$

While a given length L the lowest resonant frequency of a line open at one end is one-half that of the line shorted at both ends, the frequency differences between successive modes are identical, namely $$f_2=\frac{V_p}{2L}$$

It follows that the value of $n$ for the similar lines of equal length the frequency is not the same for both lines.

The curve of FIG. 2 shows the discrete operating frequencies, the frequency varying linearly, but not continuously, with the applied anode voltage. So long as $V_p$ is constant and the capacity loading at the input end of the line is small, the frequency spacings between different frequencies corresponding to different values of $n$ are substantially equal. This condition is substantially obtained with a low loss uniform transmission line.

It may be seen that for a given frequency range the length L of the line of FIG. 1 must be at least $$\frac{V_p}{4f}$$

(where $n=1$) and may be many times greater than that depending upon the values of $n$ involved. If relatively close frequency spacing is desired, that is, frequency intervals which are small in relation to the operating frequency, all values of $n$ in the tuning range are high. This is the usual case since the magnetron is most conveniently and reliably operated over a tuning range not exceeding 2 or 3 to one, and to obtain a large number of operating points in such a range, L must be long so that all values of $n$ are high. The tuning range limitations are essentially those of the magnetron itself apart from its output circuit, although, of course, an upper limit where losses are excessive may be reached first in the transmission line, depending upon the design of the components.

If, for example, an oscillator is desired which could be tuned over several hundred megacycles to produce carriers at six megacycle spacings as in a television receiver local oscillator, the length of line L needed to provide this separation is determined by the equation:

$$\Delta f=\frac{V_p}{2L}$$

or $$L=\frac{V_p}{2\Delta f}$$

Since $\Delta f=6$ megacycles per second and assuming $V_p$ to be constant at $2\cdot10^8$ meters per second for a given twin conductor transmission line cable, then $L=16\frac{2}{3}$ meters. For an open-ended line frequency corresponding to $n=1$ would be 3 megacycles and the values of $n$ for a frequency range from, say 453 to 903 megacycles would be between $n=76$ and $n=151$. Any of the 75 discrete carrier frequencies within such a range would be simply obtained by adjusting the direct current voltage applied to the magnetron anode. Due to the increasing losses at higher frequencies the power output does not increase indefinitely with frequency, the apparatus being conveniently designed to provide the maximum power near the center of the desired range.

FIG. 3 illustrates a magnetron 11 of a type which may be used in the apparatus of FIG. 1 and which corresponds to the magnetron 1 semi-schematically shown therein. In this example a cathode sleeve 12 containing an internal heater 13 is surrounded by eight anode segments which are spaced to define a cylindrical space charge chamber. The cathode is preferably made of thoriated tungsten or other thermionic material having a low sensitivity to temperature changes, although the more conventional alkaline earth oxides may suitably be employed. One set of four alternate anode segments 14 are connected at one end to a conductive support ring 15 mounted near one end of the cathode. Interleaved with the segments 14 is a second set of segments 16 each of which is connected at one end to the second support ring 17 mounted near the other end of the cathode. Such a magnetron construction is sometimes termed an interdigital magnetron, each set of alternate segments corresponding in function to one of the anode segments 3 or 4 of FIG. 1. A tubular envelope 18, suitably made of glass, surrounds the electrodes, and the cathode assembly and anode support rings are supported within the envelope by pairs of relatively stiff conductive leads 19 and 20 which are sealed through the base of the envelope, the external ends of the leads providing the magnetron connection terminals. The envelope device is suitably exhausted to produce a high vacuum. Still referring to FIG. 3 the anode leads 20 are connected to a transmission line corresponding to the line 5 of FIG. 1. This conveniently takes the form of a twin-conductor coaxial cable having parallel conductors 21 and a metal braid sheath 22, with dielectric spacers or beads 23 spacing the conductors with respect to each other and the sheath. This type of cable is easily rolled up into a compact coil without affecting its operations so that even very long lines need not be excessively bulky or awkward to position. While two single inner conductor coaxial cables each having a grounded outer conductor are an electrical equivalent, the twin conductor coaxial cable is preferred because of the greater shielding. Various other transmission line structures having distributed impedance may also be substituted, of course, such as might be defined by parallel printed conductors, for convenience. The conductors 24 connected across the magnetron anode terminals 20 couple output power to a load. Other means of coupling power out of the anode circuit may, of course, be substituted.

In FIG. 4 a magnetron 25 generally corresponding to that of FIG. 1 is also coupled to a two conductor transmission line 26. To provide means for adjusting the length L of the line, a pair of sliding conductive line extensions 27 are provided at one end of the line. These conductive extensions are suitably arranged to telescope over inner line extensions and thus permit adjustment of the frequency and the frequency interval between impedance maximum. A further and finer adjustment means is provided by an adjustable terminating impedance in the form of a variable capacitor 28 connected between the ends of the line extensions 27. The effective or electrical length of the line is foreshortened so that the frequency interval between impedance maxima is less than $$\frac{V_p}{2L}$$

Since the reactance of the capacitor 28 changes with frequency, the capacitor is primarily useful for frequency adjustments after the frequency having the desired harmonic relation to the transmission line has been obtained through selection of the anode voltage. By thus varying the line length in addition to varying the applied anode voltage, the magnetron can deliver power at any frequency within the tuning range.

In FIG. 4, the input end of the line is short-circuited and grounded by a conductive connection 29 thereby providing means for applying a positive voltage to the anode segments. The anodes must therefore be connected to the transmission line conductors at a point some distance removed from the input end. This distance, for optimum results, should be one-fourth wavelength or an odd multiple thereof at a center frequency in the desired range. It may be seen, therefore, that various line terminations by an impedance other than the characteristic line impedance may be made at either end of the line so as to provide impedance maxima at a number of related frequencies.

A source of direct current voltage 30 is connected between the anode and cathode, the applied voltage being varied as before to control the operating frequency. A coupling capacitor 31 connected to one of the anodes supplies an output signal with respect to ground to any desired load.

Since the propagation velocity along the line may decrease with increase in frequency due to line losses, the separation between operating points will not be uniform in such cases. The adjustment in frequency obtained by changing the physical or the effective length of the line is accordingly particularly useful in some applications. However, when the velocity remains substantially constant as the frequency is changed the frequency intervals remain uniform.

In FIG. 5 the electrode assembly of an inter-digital magnetron of a type advantageously employed in the arrangement of FIG. 4 is illustrated. Here again a cylindrical cathode 32 is surrounded by two interleaved sets 33 and 34 of four anode segments each. One set 33 is conductively supported by a split metal ring 35 and the other set 34 by another split ring 36. Mica spacer disks 37 adjacent each ring may also be employed to help support and space the unconnected ends of each set of anode segments. A conductive lead or rod 38 is attached to the split ring 35 near one end thereof, that is, near the gap in the ring defined by its split construction. A similar conductive support lead 39 is attached to the other split ring 36 near one of its ends.

Since the electrical paths along each ring from one end to the other is an extension of the transmission line 26 to which the support leads 38 and 39 are connected, the anode segments are effectively distributed along a length of the transmission line. A short circuiting termination for the end of the line corresponding to the connection 29 of FIG. 4 is provided by a metal strap 40 in the form of a U-shaped loop connecting the ends of the support rings 35 and 36 opposite the ends to which the leads 38 and 39 are respectively connected. To increase the effective length of the loop 40 the strap ends are connected to the ends of the anode segments secured to the split ring ends rather than directly to the end rings. A conductor 41 connected to the center of the loop 40 grounds that end of the transmission line or otherwise connects it to a positive voltage terminal. Magnetrons having anode segments distributed near the closed end of a transmission line are claimed and further described in U.S. Patent No. 2,521,556, issued September 5, 1950, to D. A. Wilbur and assigned to the assignee of the present invention.

In operation of the magnetron structure of FIG. 5, the distribution of the anode segments along a portion of the transmission line length assists efficient operation over a wide frequency range since adjacent pairs of segments can be operating near optimum efficiency at the different frequencies. This arrangement also decreases any effect of the anode as a line discontinuity. While the length of the fixed loop 40 is thus to some extent effectively changer, the tuning range is limited to about 2:1 since for higher ratios the impedance of the loop 40 is insufficient at the low frequency end of the range.

Whether our invention is employed as a voltage-controlled frequency switch or as a voltage tuned oscillator with such a high value of $n$ that the frequency steps are hardly discernable, various advantages of the distributed constant tank or output circuit of the voltage tunable magnetron are apparent upon contrast with a grid controlled conventional discharge device. For example, since no feedback circuit is necessary to sustain oscillations, the frequency is instead governed by the anode voltage for a given magnitude field intensity, the tuned transmission line section serving primarily to set the frequency of the frequency intervals between successive resonances. Furthermore, the output impedance need not be as high as the corresponding plate impedance of a grid controlled discharge device so that relatively inexpensive transmission line cable filled with a high dielectric constant material has a sufficiently high Q for stable oscillation. Such a transmission line may be shorter for a given frequency separation than one in which the conductors are spaced in air or vacuum conveniently and is smaller in dimensions.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. A multi-frequency magnetron oscillator comprising a magnetron discharge device of a type having two groups of anode segments surrounding an elongated cathode, an output circuit comprising a two-conductor reflective transmission line section having the conductors at one end thereof respectively connected to said two groups of anode segments, said transmission line section being electrically long compared to a wave length at the operating frequencies of said oscillator to provide a large number of impedance maxima in impedance versus operating frequency characteristic of said line which are closely spaced in frequency compared with said operating frequencies, means for applying a positive potential to said groups of anode segments to produce oscillations at frequencies corresponding to impedance maxima of said line section and means for adjusting the magnitude of said positive potential to cause operation of said oscillator successively at frequencies corresponding to successive ones of said maxima.

2. A voltage tuned magnetron oscillator comprising a magnetron discharge device of a type having two groups of anode segments, and an output circuit comprising a reflectively terminated two-conductor transmission line coupled to said two groups of anode segments, said transmission line being electrically long compared to a wave length at the operating frequencies of said oscillator to provide a large number of impedance maxima in the impedance versus operating frequency characteristic of said transmission line which are closely spaced in frequency as compared with said operating frequencies, means for supplying the positive potential to said anode segments and means for adjusting the magnitude of said positive potential to cause operation of said oscillators successively at frequencies corresponding to successive ones of said maxima whereby said line presents impedance maxima to said device at a plurality of frequencies substantially harmonically related to the fundamental frequency at which a standing wave is supported.

3. Magnetron apparatus for producing power at a plurality of spaced discrete frequencies comprising a voltage tunable magnetron having at least one pair of anode segments, a twin-conductor transmission line section coupled near one end thereof to said at least one pair of anode segments, said transmission line section being terminated with a reflective impedance and being electrically long compared to a wave length at the operating frequencies of said apparatus whereby the transmission line presents a plurality of impedance maxima to said magnetron discharge device at a plurality of frequencies closely spaced with respect to the operating frequencies of said apparatus corresponding to a fundamental frequency at which standing waves can be maintained and at substantially harmonic frequencies thereof, and means for applying an anode voltage to said magnetron to produce oscillation at a desired one of said frequencies.

4. A voltage tuned magnetron oscillator for operating at any of a plurality of spaced discrete frequencies which comprises a magnetron discharge device having an elongated cathode extending along a given axis and an anode comprising a plurality of spaced anode segments surrounding said cathode to define a cylindrical space charge chamber, means for producing an axial magnetic field and a radial electric field in said chamber to impart an average angular velocity about the cathode to electrons emitted from the cathode, an output circuit comprising a transmission line having one end coupled to said anode and the other end terminated in an impedance differing substantially from the line characteristic impedance, said line being electrically long compared to a wave length at the operating frequencies of said oscillator and thereby presenting a plurality of high impedance points at frequencies representing a substantially harmonic series, and means for varying said electric field relative to said magnetic field whereby oscillations are produced at points where when the electron average angular velocity corresponds to one of said frequencies.

5. A voltage tuned magnetron oscillator circuit comprising a magnetron discharge device having at least one pair of spaced anode segments, means for controlling the anode voltage to establish the magnetron operating frequency, and an output circuit comprising a substantially uniform transmission line section coupled to at least one pair of said anode segments, said transmission line being electrically long as compared with a wave length at the operating frequencies of said oscillator, means for coupling the conductors of said transmission line section together for application of direct current potentials to said pair of anode segments, said coupling means comprising a reflective impedance whereby said transmission line presents an impedance maxima to said magnetron device at a fundamental frequency and at substantially harmonic frequencies thereof, and means for adjusting the applied anode voltage to operate the magnetron over a range of frequencies corresponding to the impedance maxima presented by said transmission line, each frequency therein comprising one of said harmonic frequencies whereby substantial power output is provided.

6. A voltage tuned magnetron oscillator for operating at any of a plurality of spaced discrete frequencies which comprises a magnetron discharge device having an elongated cathode extending along a given axis and an anode comprising a plurality of spaced anode segments surrounding said cathode to define a cylindrical space charge chamber, means for producing an axial magnetic field and a radial electric field in said chamber to impart an average angular velocity about the cathode to electrons emitted from the cathode, an output circuit comprising a transmission line having each end reflectively terminated, said transmission line being electrically long compared to a wave length at the operating frequencies of said oscillator and said line being coupled at an intermediate region along its length to said anode to thereby present a large number of high impedance points at frequencies representing a substantially harmonic series, and means for varying said electric field relative to said magnetic field whereby oscillations are produced when the electron average angular velocity corresponds to one of said frequencies.

7. A voltage tuned magnetron oscillator circuit comprising a magnetron discharge device having at least one pair of spaced anode segments, means for controlling the anode voltage to establish the magnetron operating frequency, and an output circuit comprising a substantially uniform two conductor transmission line section coupled at an intermediate region along its length to at least one pair of said anode segments, means for connecting the conductors of said transmission line section together at one end for application of direct current potentials to said pair of anode segments, means for reflectively terminating the other end of said transmission line, said transmission line section being electrically long relative to the operating frequencies of said oscillator circuit so that the line presents a large number of impedance maxima to said magnetron device at a fundamental frequency and at substantially harmonic frequencies thereof closely spaced frequencies with respect to the operating frequencies of said oscillator circuit, and means for adjusting the applied anode voltage to operate the magnetron over a range of frequencies, each frequency therein comprising one of said harmonic frequencies whereby substantial power output is provided.

8. A voltage tuned magnetron oscillator comprising a magnetron discharge device of a type having two groups of anode segments, an output circuit comprising a reflectively terminated two-conductor transmission line coupled to said two groups of anode segments, the electrical length of said line being long compared with the operating frequencies of said oscillator so that said line presents a large number of impedance maxima to said device at a series of frequencies substantially harmonically related to the fundamental frequency at which a standing wave is supported, means for impressing an adjustable direct current potential on said groups of anode segments to determine the impedance maxima at which operation takes place and means for varying the effective length of said line to vary said fundamental frequency, said last mentioned means including a variable impedance termination for said line.

9. A voltage tuned magnetron oscillator comprising a magnetron discharge device of a type having two groups of anode segments, an output circuit comprising a reflectively terminated two-conductor transmission line coupled to said two groups of anode segments, said line being electrically long with respect to the operating frequencies of said magnetron oscillator so that said line presents a large number of impedance maxima to said device at a series of frequencies substantially harmonically related to the fundamental frequency at which a standing wave is supported, said maxima being separated by a small frequency compared to the operating frequencies of said oscillator, means for supplying an adjustable voltage to said anode segments to determine at which of said impedance maxima operation takes place and thereby control the operating frequency of the oscillator and means for varying the effective length of said line to vary said fundamental frequency, said last mentioned means including a variable capacitor coupled between the conductors at an end of said line.

References Cited by the Examiner

UNITED STATES PATENTS

| | | | |
|---|---|---|---|
| 2,265,833 | 12/41 | Fritz | 333—82 |
| 2,540,764 | 2/51 | Steigerwalt | 332—5 |

FOREIGN PATENTS

| | | |
|---|---|---|
| 230,996 | 5/44 | Switzerland. |

OTHER REFERENCES

Very High Frequency Techniques (U.S. Radio Research Laboratory staff), published by McGraw-Hill, 1947 (pages 556 and 565 relied on).

ROY LAKE, *Primary Examiner.*

WILLIAM WIESS, NORMAN H. EVANS, CHESTER L. JUSTUS, *Examiners.*